April 1, 1941. L. BEEMAN ET AL 2,236,986
RADIATOR SHIELD
Filed Aug. 31, 1938

Lyle Beeman
Harold J. Kroll
INVENTORS.

BY Ralph W. Brown
ATTORNEY.

Patented Apr. 1, 1941

2,236,986

UNITED STATES PATENT OFFICE 2,236,986

RADIATOR SHIELD

Lyle Beeman and Harold J. Kroll, Milwaukee, Wis., assignors, by mesne assignments, to J. W. Speaker Corporation, Milwaukee, Wis.

Application August 31, 1938, Serial No. 227,639

2 Claims. (Cl. 257—132)

This invention relates to shields for the radiators of motor vehicles.

In automobiles of modern design, wherein the radiator is hidden behind a decorative grill spaced a substantial distance ahead of it, attempts to protect the radiator against the cold of winter and insects of summer have consisted in the main of applying interchangeable curtains over the exposed face of the grill, one curtain of impervious material for winter driving and another of screening for summer driving.

Such expedients have not proven entirely satisfactory, not alone because they detract from the appearance of the automobile or because each must be replaced by the other as the seasons change, but also because they, and particularly the winter curtain, are functionally inefficient. Because of the wide spacing between the curtain and radiator, no part of the radiator is immune to contact with the cold winter blasts which invariably seep or flow around and over the curtain and ultimately sweep over the face of and through the radiator.

An object of the present invention is to provide a combined wind break and insect guard of simple and inexpensive construction which may be readily installed between the radiator and decorative grill of a motor vehicle where it will be hidden from view and capable of effectively serving its purposes.

Another object is to provide a novel combination and arrangement of wind break curtain and screen insect guard for motor vehicle radiators wherein the screen serves as a protective backing or support for the curtain.

Another object is to provide a novel wind break for motor vehicle radiators which may be readily installed between the radiator and decorative grill and conveniently adjustable to effectively protect any desired portion of the radiator against admission of cold air.

Another object is to provide a self clearing wind break for motor vehicle radiators.

Another object is to provide a self clearing combined wind break and insect guard for motor vehicle radiators.

Other more specific objects and advantages will appear, expressed or implied, from the following description of an illustrative embodiment of the present invention.

Figure 1:
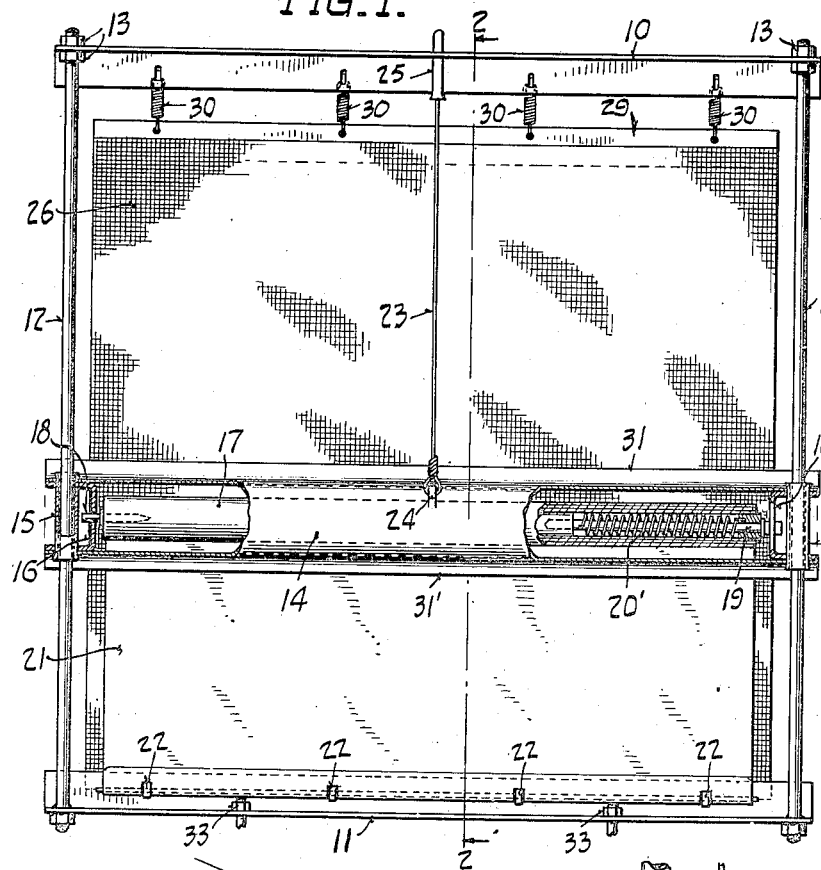
Figure 1 is a view in front elevation of a shield for motor vehicle radiators constructed in accordance with the present invention.

The radiator shield selected for illustration comprises an appropriate rectangular frame composed of upper and lower bars 10 and 11 of light weight angle iron rigidly connected by vertical rods 12, which in this instance are welded to the lower bar 11 and attached to the upper bar 10 by nuts 13.

In the construction shown, the rods 12 also serve as guides for a suitable curtain roll carrier or housing 14 preferably of sheet metal and of substantially semi-cylindrical form. The housing extends horizontally from rod to rod and is equipped at opposite ends with tubular guides 15 which extend vertically therethrough and which are fixed thereto preferably by welding. Each tube 15 also extends through the upper and lower legs of a U-shaped bracket 16 which is rigidly fixed thereto and to the housing 14, each bracket constituting a support for an end of a curtain roller 17.

The curtain roller 17 is supported at one end by the usual end pin 18, rotatable in one of the brackets 16, and at the other end by a pin 19, rotatable in the roller and having a flattened head engaged in a vertical slot 20 in the other of the brackets 16. A spring 20' coacts in the usual manner with the roller 17 and pin 19 to urge the roller to rotate in a direction to roll the curtain 21 onto the roller. The curtain 21 extends from the roller 17 through the rear open side of the housing 14 and downwardly to the lower frame bar 11 to which it is attached by appropriate means such as hooked lugs 22 which are struck up from the bar 11 and penetrate the reinforced end edge of the curtain.

The housing 14 is supported and its elevation along the guide rods 12 controlled by appropriate means, such as a wire 23, which is attached to an ear 24 provided on the housing midway of its length, and which may be extended through suitable tubing 25 and to a point for convenient manipulation from the driver's seat of the automobile. It will of course be understood that the wire 23 supports the housing, and consequently the roll of curtain, against the tension in the curtain 21 induced by the roller spring 20', so that by drawing in or paying out the wire 23 the housing 14 may be raised or lowered and the curtain 21 extended under tension over a greater or less area of the radiator face. It will also be noted that since the housing and curtain roller are closely confined by the guide rods 12 there is no danger of objectionable rattle.

The radiator shield shown also includes an insect guard in the form of a wire screen 26 also carried by the frame. Although the screen 26 may be variously positioned, arrangement of it behind the curtain permits it to sustain or support the latter against the wind pressure on the front thereof and to protect it against the cutting or wearing action of the radiator fins disposed immediately behind it. In this instance the lower reinforced edge 27 of the screen 26 is attached to the lower frame bar 11 by means of hooked lugs 28, similar to the lugs 22 above described, and the upper reinforced edge 29 thereof is supported from the upper frame bar 10 through a series of spaced springs 30 which serve to tension the screen and thereby maintain the same in a taut condition.

Figure 2:
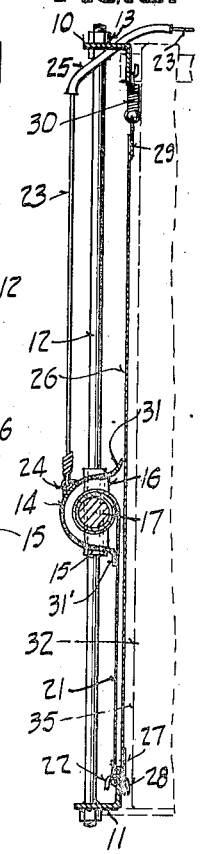
Fig. 2 is a vertical sectional view taken substantially along the line 2—2 of Fig. 1.

The screen 26 is preferably stretched closely behind the curtain 21, as indicated in Fig. 2, and the upper longitudinal edge 31 of the housing 14 is preferably rearwardly extended and slightly upwardly curved to bear against the screen 26 so that it may serve as a scraper blade for cleaning the screen as the housing is moved up and down over the screen. Material thus removed from the screen, such as accumulated insects, will of course fall over and forwardly of the housing and escape below. The lower longitudinal edge 31' of the housing 14 is also preferably similarly formed to provide a scraper blade for cleaning the curtain 21 in a similar manner.

Figure 4:
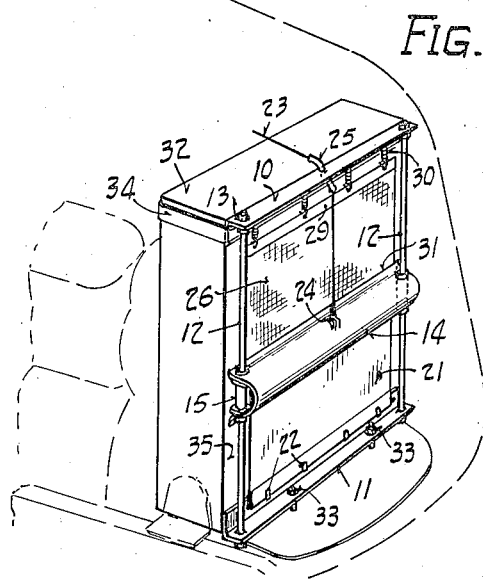
Fig. 4 is a view in perspective of the radiator shield showing the same installed in front of the radiator.
Figure 3:
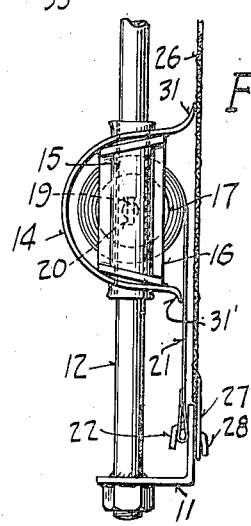
Fig. 3 is a fragmentary view in side elevation on a somewhat larger scale.

It has been found that in many automobiles the radiator shield shown can be readily installed by merely passing it over the top of the radiator 32 and down into the position indicated in Fig. 4 immediately in front of the radiator, after the motor hood has been raised. In that position the lower frame bar 11 may be bolted, as indicated at 33, to the usual pan which ordinarily extends forwardly from the bottom of the radiator, and the upper bar 10 may be strapped to the radiator by an appropriate band 34 encircling the upper part of the radiator and the vertical web of bar 10. In this position the screen 26 lies closely adjacent or against the front face 35 of the radiator 32, as indicated in Fig. 2, where it separates and protects the adjacent curtain 21 from wearing contact with the radiator fins.

Various changes may be made in the embodiment of the invention hereinabove specifically described without departing from or sacrificing the advantages of the invention as defined in the appended claims.

We claim:

1. A radiator shield for motor vehicle radiators comprising a screen positioned over the face of said radiator, a shield, a carrier for one end of said shield movable to extend said shield to cover variable portions of said screen, and a blade on said carrier contacting said screen and movable with said carrier to clear said screen of foreign material.

2. A radiator shield for motor vehicle radiators comprising a screen, a curtain having one end fixed with respect to the said screen, a roller having a portion of said curtain rolled thereon, a roller carrier movable to extend said curtain to cover variable portions of said screen, said carrier including a cover for the roll portion of said curtain, said cover having trailing edges contacting said screen and the exposed portion of said curtain for cleaning said screen and said curtain of foreign material during movement of said carrier.

LYLE BEEMAN.
HAROLD J. KROLL.